US005536979A

United States Patent [19]
McEachern et al.

[11] Patent Number: 5,536,979
[45] Date of Patent: Jul. 16, 1996

[54] CHARGER FOR HAND-HELD RECHARGEABLE ELECTRIC APPARATUS WITH SWITCH FOR REDUCED MAGNETIC FIELD

[76] Inventors: Alexander McEachern, 6067 Rockridge Blvd., Oakdale, Calif. 94618; Thomas B. Haverstock, 3107 Franklin St., San Francisco, Calif. 94123

[21] Appl. No.: 268,840

[22] Filed: Jun. 30, 1994

[51] Int. Cl.$^6$ .................... H01F 38/00; H02J 7/00
[52] U.S. Cl. .................. 307/104; 307/150; 320/2; 336/DIG. 2
[58] Field of Search .................. 307/104, 117, 307/119, 131, 150, 154, 326–328; 336/DIG. 2; 320/2, 39, 43, 48; 363/95, 97; 324/126, 127; 361/42, 49, 173–175, 179; 327/370, 372, 510, 514; 257/679, 922; 902/26

[56] References Cited

U.S. PATENT DOCUMENTS

| | | | |
|---|---|---|---|
| 4,031,449 | 6/1977 | Trombly | 320/2 |
| 4,496,896 | 1/1985 | Melocik et al. | 320/2 |
| 4,543,556 | 9/1985 | Taylor et al. | 336/210 |
| 4,827,550 | 5/1989 | Graham et al. | 15/22 R |
| 4,827,551 | 5/1989 | Maser et al. | 15/24 |
| 4,827,552 | 5/1989 | Bojar et al. | 15/28 |
| 4,845,795 | 7/1989 | Crawford et al. | 15/22 R |
| 4,845,796 | 7/1989 | Mosley | 15/23 |
| 5,216,402 | 6/1993 | Carosa | 336/66 |
| 5,264,776 | 11/1993 | Hulsey | 320/2 |

OTHER PUBLICATIONS

"Electromagnetic Fields," Consumer Reports, May 1994, pp. 354–359.

"Exposure to Residential Electric and Magnetic Fields and Risk of Childhood Leukemia," University of Southern California, Electric Power Research Institute EN–7464, Project 2964–1, Interim Report (Report Summary only), Nov. 1991.

"Exploring the Options for Magnetic Field Management," EPRI Journal, Oct./Nov. 1990, pp. 5–19.

Gordon Miller, "Exposure Guidlines for Magnetic Fields," American Industrial Hygiene Association Journal, Dec. 1987, vol. 48, pp. 957–968.

J. R. Gauger, "Household Appliance Magnetic Field Survey," IEEE Transactions on Power Apparatus and Systems, Sep. 1985, vol. PAS–104, No. 9.

*Primary Examiner*—William M. Shoop, Jr.
*Assistant Examiner*—Richard T. Elms
*Attorney, Agent, or Firm*—Haverstock & Associates

[57] ABSTRACT

A system transfers electric power between two devices using a magnetic coupling and no electrical connections. Each device incorporates a magnetic core surrounded by a coil. When properly aligned the cores form a closed magnetic circuit whereby stray magnetic fluxes are substantially reduced. In the preferred embodiment, a base unit incorporates a substantially 'C' shaped magnetic core surrounded by its respective coil. A portable detachable device, such as an electric toothbrush, incorporates a substantially linear shaped magnetic core surrounded by its coil. The linear shaped magnetic core and the portable device are configured to fit within a gap formed in the 'C' shaped magnetic core forming a substantially closed magnetic circuit thereby. Stray magnetic fluxes are thus significantly reduced. Additionally, an apparatus deactivates the power to the coil in the base unit when the portable device is removed from the base unit or when the battery within the portable device is charged to a predetermined level.

20 Claims, 4 Drawing Sheets

5,536,979

1
CHARGER FOR HAND-HELD RECHARGEABLE ELECTRIC APPARATUS WITH SWITCH FOR REDUCED MAGNETIC FIELD

FIELD OF INVENTION

This invention relates to electrically-operated hand-held devices. More specifically, it relates to hand-held devices operated by rechargeable batteries in which the recharger is magnetically coupled to the hand-held device through a mechanically separable transformer.

BACKGROUND OF INVENTION

Hand-held battery-operated devices, such as electric tooth brushes, radio transceivers, otoscopes, ophthalmoscopes, and cellular telephones, are well known in the art.

For such devices, battery operation is often both more convenient and safer than operating from standard alternating current (AC) outlets. Devices equipped with rechargeable batteries are yet even more convenient, because the batteries do not have to be replaced periodically.

One well known technique for recharging such batteries is to equip the hand-held device with an electrical connector. A recharger, which typically converts the high voltage AC available from an outlet to low voltage AC or direct current (DC), is coupled electrically to this connector. Devices that employ this approach are disclosed in U.S. Pat. Nos. 4,827,551 and 4,827,552. This technique has four well-known disadvantages. First, it requires a hole for the connector through the device's enclosure, making it difficult to seal the device's internal parts against water, dirt, solvents, and so forth. Second, the device, its battery or the charger can be discharged, damaged or destroyed if the terminals of the connectors are shorted, such as by water. Third, it provides an unlikely but still possible electrical connection between the user of the hand-held device and the AC outlet. Fourth, the electrical contacts may become dirty or corroded, making electrical connection difficult.

An improved charger, known in the art, eliminates any electrical connection between the hand-held device and the AC outlet. Instead, the required recharging power is coupled magnetically between the recharger and the hand-held device. The charger contains the primary of a transformer, and the hand-held device contains the secondary of a transformer. The primary and the secondary of the transformer are mechanically separable. When the two are placed in proper orientation and close proximity, a varying magnetic field is electrically induced in the primary of the transformer, and is then coupled to the secondary of the transformer. The secondary coil of the transformer is used to generate charging current for the rechargeable batteries. This approach allows the hand-held device to be completely sealed, and provides no electrical connection between an AC outlet and the hand-held device.

One device that employs such a charging arrangement is the Interplak® Home Plaque Removal Instrument manufactured by Bausch & Lomb of Tucker, Ga., and described, in part, in the disclosure of U.S. Pat. No. 4,845,795.

However, such an approach can produce substantial low- and medium-frequency magnetic fields in the vicinity of the charger.

Although at present there are no widely-accepted limits on human exposure to magnetic fields, most authorities recommend prudent avoidance.

2

An improved charger which reduces the magnetic fields produced in the vicinity of such a charger while maintaining the advantages of a separable core transformer is disclosed in the co-pending U.S. patent application Ser. No. 08/309,945 which is a continuation-in-part of U.S. patent application Ser. No. 08/269,392, now abandoned.

During charging with that technology, the stray magnetic fields are substantially reduced by forming a closed magnetic circuit between a charger base unit and the portable device. However, even in such improved chargers, significant magnetic fields may be produced by the charger when the hand-held device is removed from the charger.

When the hand-held device is placed in the charger, smaller magnetic fields may still be produced by such improved chargers. Such smaller magnetic fields continue to be produced unnecessarily even when the batteries in the hand-held device are fully charged.

It is an object of the present invention to retain the advantages of a mechanically-separable transformer charger arrangement for hand-held rechargeable-battery operated devices, while substantially reducing the exposure to low- and medium-frequency magnetic fields produced near such a charger arrangement by turning off or otherwise disabling the charger either at times when such a hand-held device is removed from the charger, or at times when the batteries in such a hand-held device are fully charged, or both.

It is a further object of this invention to reduce the power consumption of such chargers either at times when such a hand-held device is removed from the charger, or at times when the batteries in such a hand-held device are fully charged, or both.

DETAILED DESCRIPTION OF A PREFERRED EMBODIMENT

Figure 1:
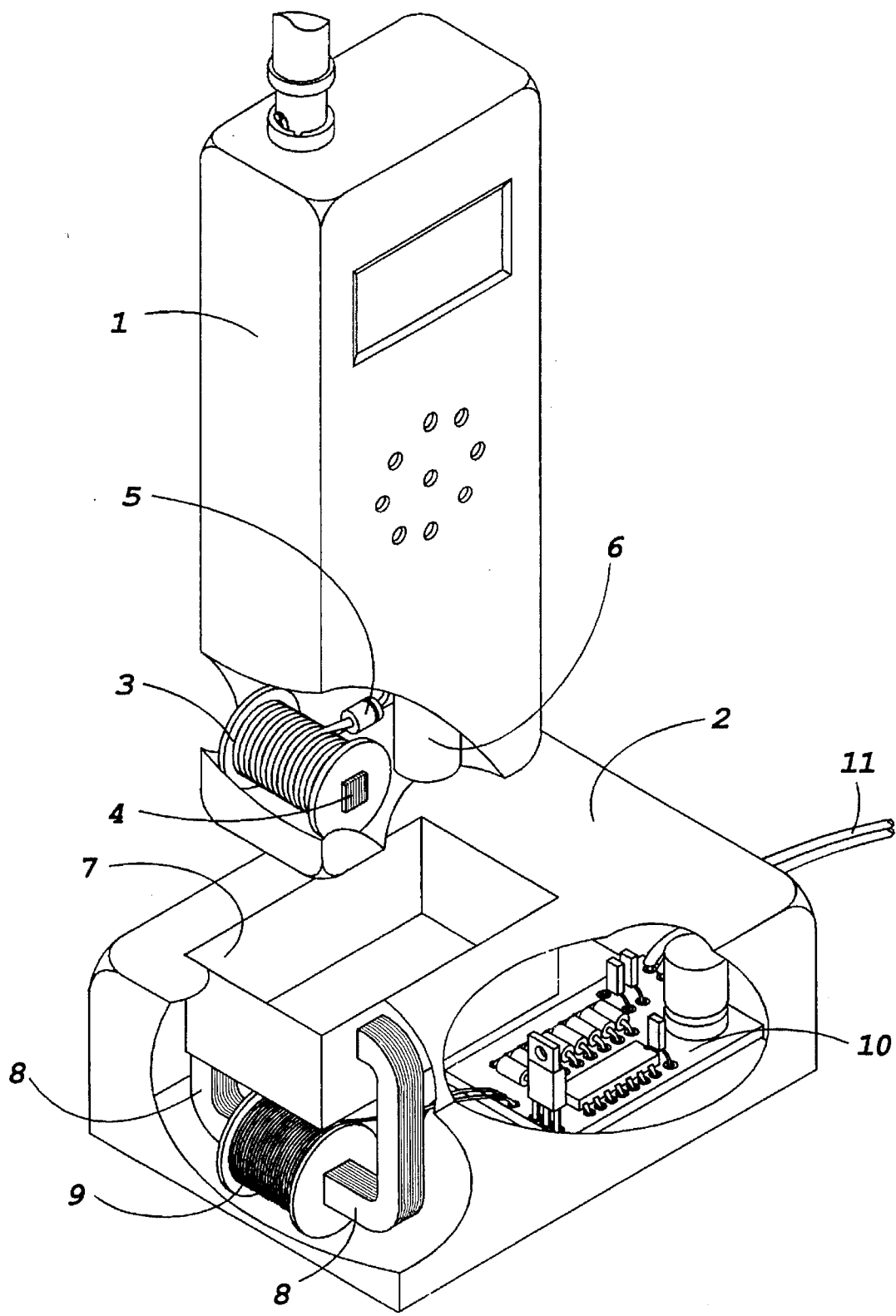
FIG. 1 is a perspective view of the present invention, with portions of the hand-held device and its recharger/holder cut away to reveal the mechanically separable transformer and its associated circuitry.

Turning first to FIG. 1, we see a hand-held battery-operated device, in this case a portable radio transceiver 1, and its associated charger/base 2. It will be clear to one familiar with the art that the transceiver 1 is simply an illustrative member of a much broader class of portable devices.

The charger/base is connected to a power source such as an AC outlet through a cable 11. Through a portion of the charger/base that has been cut away, we see a primary transformer winding 9, which may in some embodiments be driven directly with the AC current delivered through the cable 11. In the preferred embodiment shown in FIG. 1, the primary transformer winding 9 is driven with a higher frequency current generated by electronic circuitry 10 contained within the charger/base 2, which in turn receives power from the cable 11.

Examining the radio transceiver 1 of FIG. 1, we see that a portion of its enclosure has been cut away to reveal a rechargeable battery 6, a secondary coil 3 with its associated core 4, and a rectifier 5 for converting the alternating current generated in the secondary coil 3 into direct current for recharging the battery 6.

Examining the separable transformer formed by primary coil 9, primary core 8, secondary coil 3, and secondary core 4, we see that when the radio transceiver 1 is resting in recess 7 of charger/base 2, the primary core 8 and the secondary core 4 form a substantially closed magnetic circuit, thus minimizing the magnetic field in the vicinity of the charger/base 2.

However, when the transceiver EL is removed from the charger/base 2, a large magnetic gap appears in transformer primary core 8. If AC current is allowed to continue to flow through transformer primary 9 under these circumstances, a significant magnetic field may be generated in the vicinity of the charger/base 2. Consequently, in order to minimize the magnetic field at all times, it is necessary to detect the presence of transceiver 1 before providing significant current to transformer primary 9. Additionally, if AC current is allowed to continue to flow through the transformer primary 9, electric power is needlessly consumed in the winding.

Figure 2:
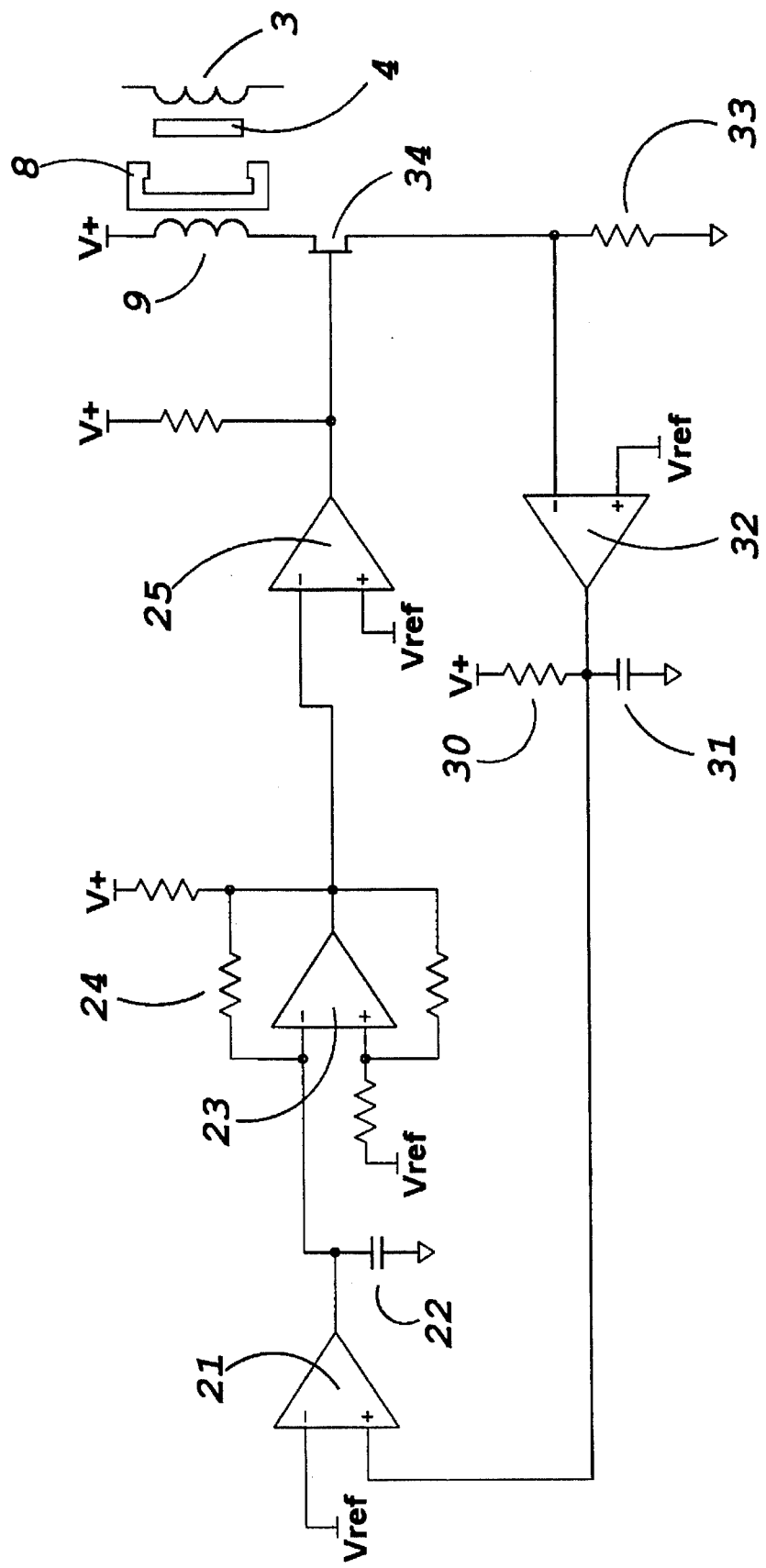
FIG. 2 is an electronic schematic of a portion of the preferred embodiment of the present invention shown in FIG. 1.

Turning now to FIG. 2, we see an electronic schematic of the circuitry 10 of FIG. 1. Further inspecting the schematic of FIG. 2, we see the symbol V+ has been used to indicate a positive supply voltage, and the symbol Vref has been used to indicate a positive reference voltage of substantially lower voltage than the positive supply voltage. We also see four voltage comparators 21, 23, 25, 32 which may be any common open-collector voltage comparator, such as the model 339A Quad-voltage comparator manufactured by National Semiconductor of Santa Clara, Calif. We also see several other components whose values and functions will be identified below.

Examining comparator 25, we see that it functions as an inverting driver for field-effect transistor 34, which in turns drives the primary coil 9 of a separable transformer which is composed of primary coil 9, primary core 8, secondary core 4, and secondary coil 3, also seen in FIG. 1.

Turning now to comparator 23 in 2 FIG. 2, we see that it is configured as an oscillator whose frequency is determined by the resistor 24 and the capacitor 22. In the preferred embodiment, the resistor 24 and the capacitor 22 are chosen so that the oscillator generates an approximately square wave at a frequency of approximately 50 kilohertz. We also see that the oscillator may be disabled by the output of comparator 21, and that the output of the oscillator drives comparator 25.

Turning our attention now to the comparator 32, we see that it compares the current flowing in the primary coil 9, as sensed by the resistor 33, to a fixed reference voltage. If the current exceeds some chosen, fixed limit determined by the value of the resistor 33 and the value of the reference voltage, the comparator 32 discharges the capacitor 31, which in turn causes the comparator 21 to disable the oscillator formed by the comparator 23. In the preferred embodiment, the resistor 30 and the capacitor 31 are chosen to have a time constant of 2 seconds.

Noting that it is easy to choose an oscillator frequency such that substantially higher current will flow through transformer primary 9 when the secondary core 4 is removed than will flow when the secondary core 4 is present, we can now see how the circuit of FIG. 2, as a whole, works.

If the secondary core 4 is present, the comparator 32 never sees high current in the transformer primary 9; consequently, the oscillator formed by comparator 23 runs continuously.

If, however, the secondary core 4 is absent because the hand-held device has been removed from its charger/base, comparator 32 will see high current in the transformer primary 9 and will discharge capacitor 31, which, through comparator 21, will stop the oscillator formed by comparator 23. This, in turn, will stop the current flowing in the transformer primary 9. Approximately 2 seconds later, capacitor 31 will have recharged sufficiently through resistor 30 to allow the oscillator to operate again. If the secondary core 4 has been replaced by this point in time, the oscillator will run continuously; if it has not, the oscillator will run for a single 20-microsecond cycle, then be disabled for another two seconds.

It will be apparent to one familiar with the art that an indicator, such as a light-emitting diode, may be functionally attached to the output of comparator 21. Such a diode will flash intermittently when the hand-held device has been removed from its charger/base, and will light continuously when the hand-held device is properly placed for charging.

In alternate embodiments not shown in the figures, the transformer primary may be disabled by alternate means at those times when the hand-held device is removed from its charger/base.

One alternate means not shown in the figures for disabling the transformer primary consists of placing a normally-open magnetically-operated reed switch in series with the transformer primary, and placing a permanent magnet in the hand-held device in such a way that the permanent magnet operates the reed switch when the hand-held device is placed in its charger/base.

A second alternate means not shown in the figures consists of placing a normally-open mechanically-activated switch in series with the transformer primary in such a way that the switch is activated when the hand-held device is placed in its charger/base.

A third alternate means not shown in the figures consists of placing an optically-coupled phototransistor and light emitting diode in the charger/base in such a way that the presence of the hand-held device interrupts the optical path, thus enabling the primary of the transformer.

It will be apparent to one familiar with the art that other means for disabling the transformer primary when the hand-held device is not in its charging position may be employed.

Figure 3:
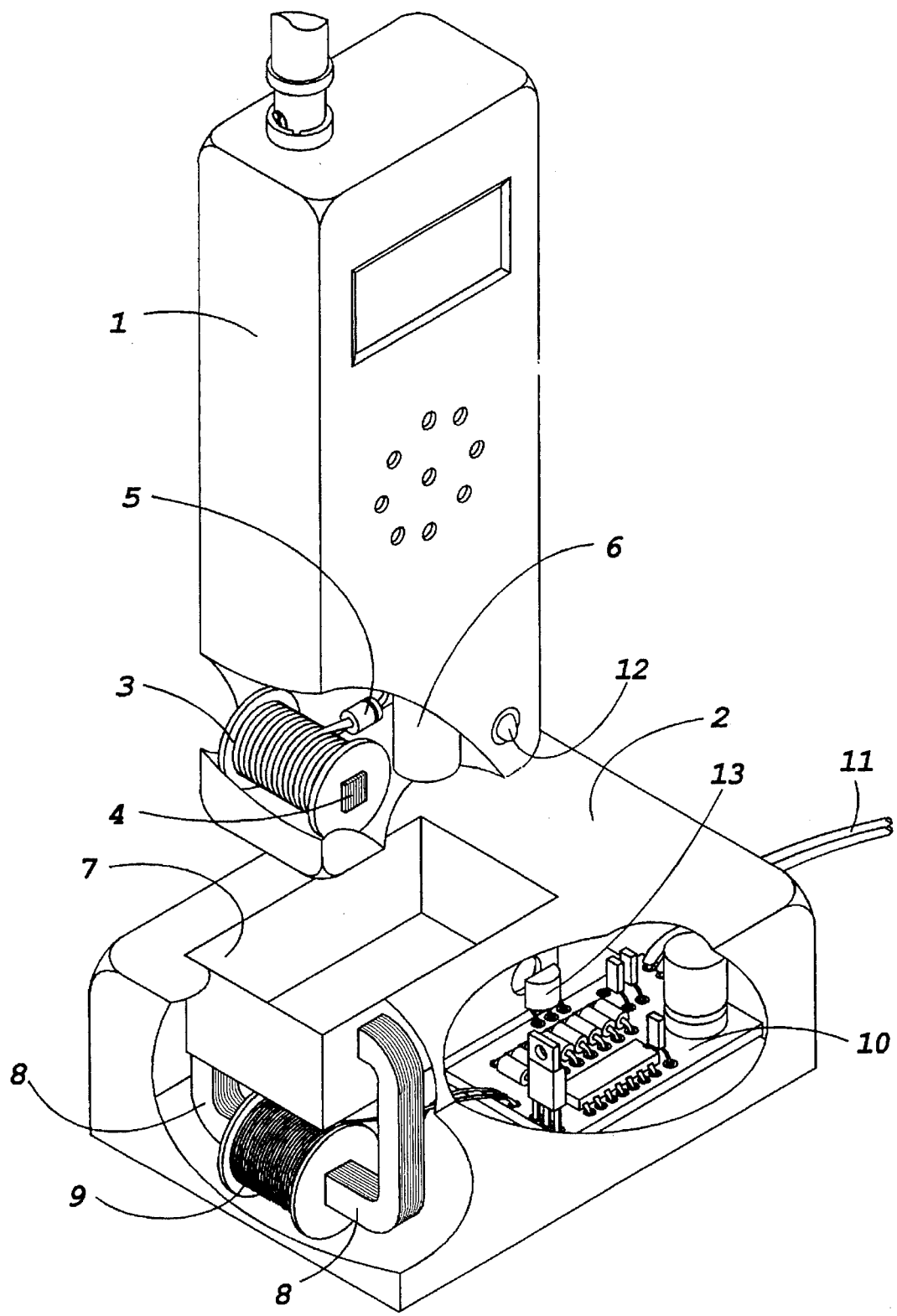
FIG. 3 is a perspective view of an alternate embodiment of the present invention.

Turning now to FIG. 3, we see an alternate embodiment of the present invention. This alternate embodiment is substantially the same as the embodiment shown in FIG. 1; however, a light emitting diode 12 has been added to the transceiver 1, and a phototransistor 13 has been added to the charger/base circuitry. The light emitting diode 12 and the phototransistor 13 are positioned so that the light emitting diode 12 can, if energized when the transciever 1 is properly positioned in its charger/base 2, switch on the phototransistor 13.

Well-known circuitry inside the transceiver 1 determines if the rechargeable battery 6 requires charging. Such circuitry may, for example, monitor the battery temperature, the battery voltage, and other battery parameters. One such circuitry is implemented in the MAX 713 integrated circuit, available from Maxim Incorporated of Santa Clara, Calif. If such circuitry determines that the battery 6 is fully charged, it illuminates the light emitting diode 12. This illumination, in turn, activates the phototransistor 13, which in turn disables the charging circuitry 10.

Figure 4:
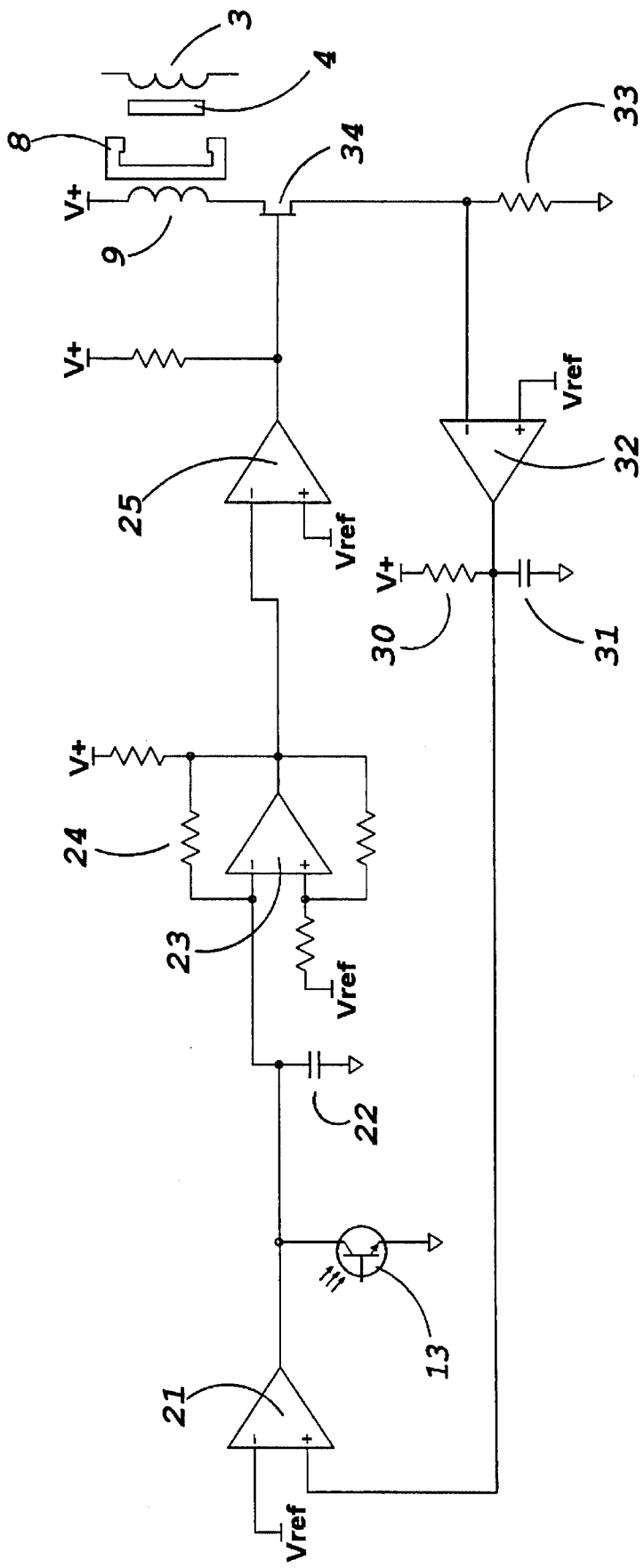
FIG. 4 is an electronic schematic of a portion of the alternate embodiment of the present invention shown in FIG. 2.

Turning now to FIG. 4, we see a schematic that shows the charging circuitry 10 of FIG. 3, and is substantially identical to that shown in FIG. 2; however, we see a phototransistor 13 has been added in such a way that, if it is illuminated, it disables the oscillator formed by comparator 23 and its associated components.

It will be apparent to one familiar with the art that the logical function of the light-emitting diode 12 and phototransistor 13 could be inverted. It will be apparent to one familiar with the art that the logical communication of the battery charging requirement between the hand-held device and its charger/base could be accomplished using any alternative well-known non-contact means, such as inductively coupling a signal between the hand-held device and its charger/base.

It will be apparent to one familiar with the art that the hand-held device could alternatively indicate that its charger/base should shut off by drawing substantial current from its secondary coil 3, thus triggering the primary coil over-current sensing shown in FIG. 2 and FIG. 4.

It will be apparent to one familiar with the art that certain well-known circuit details, not necessary to understanding of the present invention, have been omitted from FIG. 2 and FIG. 4, such as protection diodes, power supply components and voltage reference components.

It will be apparent to one familiar with the art that various substitutions may be made in the component values, frequencies, and operating regions without departing from the spirit and scope of the present invention as fully defined in the appended claims.

We claim:

1. A system including a first electric circuit for transferring AC electric power to a second electric circuit which is mounted within a portable device such that the second electric circuit and the device are separable from the first electric circuit, wherein there is no electrical connection between the first electric circuit and the second electric circuit, wherein the first circuit comprises a first coil coupled around a first magnetic core wherein the first coil is coupled to receive an AC power signal for forming a magnetic field and wherein the second circuit comprises a second magnetic coil coupled around a second magnetic core for receiving the magnetic field, wherein the first magnetic core and the second magnetic core are substantially aligned for forming a completed magnetic circuit for reducing stray magnetic fluxes, the system further comprising means for deactivating the AC power signal to the first coil when the second magnetic core is removed from alignment wherein the means for deactivating comprises a circuit for detecting whether the second magnetic core is removed from alignment by monitoring a response to the AC power signal.

2. The system according to claim 1 wherein the circuit for detecting comprises a circuit for measuring a current flowing in the first coil.

3. The system according to claim 2 wherein the circuit for measuring a current flowing in the first coil senses a voltage representative of the current flowing in the first coil.

4. The system according to claim 1 further comprising means for periodically activating the AC power signal to the first coil during periods in which the first magnetic core and the second magnetic core are not substantially aligned.

5. The system according to claim 1 further comprising means for deactivating the AC power signal to the first coil when a battery is charged to a predetermined level.

6. The system according to claim 5 wherein the means for deactivating the AC power signal to the first coil when the battery is charged to a predetermined level comprises a circuit coupled to the battery for illuminating a LED when the battery is charged to the predetermined level and for extinguishing the LED when the battery is not charged to the predetermined level.

7. A system including a first electric circuit for transferring AC electric power to a second electric circuit which is mounted within a portable device such that the second electric circuit and the device are separable from the first electric circuit, wherein there is no electrical connection between the first electric circuit and the second electric circuit, wherein the first circuit comprises a first coil coupled around a first magnetic core wherein the first coil is coupled to receive an AC power signal for forming a magnetic field and wherein the second circuit comprises a second magnetic coil coupled around a second magnetic core for receiving the magnetic field, wherein the first magnetic core and the second magnetic core are substantially aligned for forming a completed magnetic circuit for reducing stray magnetic fluxes, wherein the second circuit further comprises a rectifier coupled to the coil and a battery coupled to the rectifier for storing power and further wherein the first circuit comprises a circuit for deactivating the AC power signal to the first coil when the battery is charged to a predetermined level wherein the circuit for deactivating comprises a circuit coupled to the battery for illuminating a LED when the battery is charged to a predetermined level and for extinguishing the LED when the battery is not charged to the predetermined level.

8. The system according to claim 7 wherein the circuit for deactivating further comprises a circuit coupled for measuring a current in the first coil.

9. The system according to claim 8 wherein the circuit for measuring further comprises means for comparing the current in the first coil to a predetermined level and for generating a control signal when the current in the first coil exceeds the predetermined level.

10. The system according to claim 7 further comprising means for deactivating the AC power signal to the first coil when the second magnetic core is removed from alignment.

11. The system according to claim 10 further comprising means for detecting whether the second magnetic core is removed from alignment.

12. The system according to claim 11 wherein the means for detecting comprises a circuit for measuring a current flowing in the first coil.

13. The system according to claim 11 further comprising means for periodically activating the AC power signal to the first coil during periods in which the second magnetic core is removed from alignment.

14. A system including a first electric circuit for transferring AC electric power to a second electric circuit which is mounted within a portable device such that the second electric circuit and the device are separable from the first electric circuit, wherein there is no electrical connection between the first electric circuit and the second electric circuit, wherein the first circuit comprises a first coil coupled around a first magnetic core wherein the first coil is coupled to receive an AC power signal for forming a magnetic field and wherein the second circuit comprises a second magnetic coil coupled around a second magnetic core for receiving the magnetic field, wherein the first magnetic core and the second magnetic core are substantially aligned for forming a completed magnetic circuit for reducing stray magnetic fluxes, the system further comprising:

a. means for sensing a level of current flowing in the first magnetic coil;

b. means for comparing coupled to compare the level of current flowing in the first magnetic coil to a first reference level wherein the means for comparing forms a control signal wherein the control signal obtains a first control level when the level of current flowing in the first coil is less than the first reference level and wherein the control signal periodically transitions between the first control level and a second control level when the level of current flowing in the first magnetic coil is greater than the first reference level;

c. an oscillator for forming an oscillator output signal coupled to receive the control signal wherein the oscillator output signal is enabled when the control signal obtains the first control level and wherein the oscillator output signal is disabled when the control signal obtains the second control level; and d. a switch for controlling the AC power signal to the first magnetic coil coupled to receive the oscillator output signal.

15. The system according to claim 14 further comprising a LED coupled to receive the control signal wherein the LED is illuminated when the control signal obtains the first control level and wherein the LED is extinguished when the control signal obtains the second control level whereby the LED is illuminated when the first magnetic core and the second magnetic core are substantially aligned and further whereby the LED flashes periodically when the first magnetic core and the second magnetic core are not substantially aligned.

16. The system according to claim 14 wherein the means for comparing comprises:

a. a first comparator having a first comparator input, a second comparator input and a first comparator output wherein the first comparator input is coupled to the means for sensing and the second comparator input is coupled to receive the first reference level;

b. a resistor having a first resistor terminal and a second resistor terminal wherein the first resistor terminal is coupled to the first comparator output and the second resistor terminal is coupled to a supply voltage;

c. a capacitor having a first capacitor terminal and a second capacitor terminal wherein the first capacitor terminal is coupled to the first comparator output and the second capacitor terminal is coupled to a second reference level wherein the first comparator output is coupled to form the control signal.

17. The system according to claim 16 further comprising a second comparator having a third comparator input, a fourth comparator input and a second comparator output wherein the third comparator input is coupled to a third reference level, the fourth comparator input is coupled to the first comparator output and the second comparator output forms the control signal.

18. The system according to claim 17 further comprising:

a. a rectifier for rectifying a current in the second magnetic coil for forming a rectified signal;

b. a battery coupled to be charged by the rectified signal;

c. a means for determining if the battery is charged to a predetermined level; and e. a means for disabling the AC power signal to the first coil if the battery is charged to the predetermined level.

19. The system according to claim 18 wherein the means for determining if the battery is charged to the predetermined level comprises a LED coupled to the battery wherein the LED is illuminated if the battery is charged to the predetermined level and wherein the LED is extinguished if the battery is not charged to the predetermined level.

20. The system according to claim 19 wherein the means for disabling the AC power signal to the first coil if the battery is charged to the predetermined level comprises a photodetector coupled to disable the oscillator output if the LED is illuminated.

* * * * *

UNITED STATES PATENT AND TRADEMARK OFFICE
CERTIFICATE OF CORRECTION

PATENT NO. : 5,536,979
DATED : July 16, 1996
INVENTOR(S) : McEachern et al.

It is certified that error appears in the above-identified patent and that said Letters Patent is hereby corrected as shown below:

On the cover page of the Patent, the inventor's city is incorrect. Please change "Oakdale" to --Oakland--.

The following references were not listed on the patent. Please include under References Cited:

--U.S. Patent 4,260,943
U.S. Patent 4,654,573
U.S. Patent 4,800,328
U.S. Patent 4,942,352
U.S. Patent 5,367,242--.

In column 3, line 14, "transceiver EL" should have been typed --tranceiver 1--.

Signed and Sealed this

Twelfth Day of November, 1996

Attest:

BRUCE LEHMAN

*Attesting Officer*  *Commissioner of Patents and Trademarks*